(12) United States Patent
Andersen

(10) Patent No.: US 6,760,380 B1
(45) Date of Patent: Jul. 6, 2004

(54) DATA TRANSMISSION APPARATUS AND METHOD

(75) Inventor: James N. Andersen, Elgin, IL (US)

(73) Assignee: Lynk Labs, Inc., Elgin, IL (US)

( * ) Notice: Subject to any disclaimer, the term of this patent is extended or adjusted under 35 U.S.C. 154(b) by 0 days.

(21) Appl. No.: 09/455,276

(22) Filed: Dec. 6, 1999

Related U.S. Application Data

(60) Provisional application No. 60/111,170, filed on Dec. 7, 1998.

(51) Int. Cl.[7] .................. H04L 25/00; H04L 27/00; H04L 27/20
(52) U.S. Cl. .................. 375/257; 375/259; 375/295
(58) Field of Search ................. 375/257, 259, 375/295, 258, 284, 285, 296; 327/333; 179/16; 178/120; 379/387; 455/188

(56) References Cited

U.S. PATENT DOCUMENTS

| | | | |
|---|---|---|---|
| 3,952,212 A | 4/1976 | Matsumoto et al. | 307/243 |
| 4,176,272 A | 11/1979 | Powers | 219/216 |
| 4,450,366 A | 5/1984 | Malhi et al. | 307/297 |
| 4,600,811 A | * 7/1986 | Hayashi et al. | 179/16 |
| 4,777,331 A | * 10/1988 | Borst | 178/120 |
| 4,852,160 A | 7/1989 | Kiko et al. | 379/405 |
| 5,278,464 A | 1/1994 | Pelley, III et al. | 307/455 |
| 5,289,500 A | * 2/1994 | Inou et al. | 375/224 |
| 5,293,081 A | 3/1994 | Chiao et al. | 307/270 |
| 5,296,756 A | 3/1994 | Patel et al. | 307/443 |
| 5,306,965 A | 4/1994 | Asprey | 307/448 |
| 5,408,146 A | 4/1995 | Nguyen et al. | 326/86 |
| 5,420,499 A | 5/1995 | DeShazo | 323/315 |
| 5,420,919 A | * 5/1995 | Arnaud et al. | 379/387 |
| 5,512,853 A | * 4/1996 | Ueno et al. | 327/333 |
| 5,566,204 A | * 10/1996 | Kardontchik et al. | 375/219 |
| 5,568,064 A | 10/1996 | Beers et al. | 326/31 |
| 5,893,027 A | * 4/1999 | Brueske | 455/188 |

FOREIGN PATENT DOCUMENTS

| | | |
|---|---|---|
| DE | 198 59 178 C 1 | 5/2000 |
| EP | 0 615 375 A2 | 9/1994 |

OTHER PUBLICATIONS

International Search Report mailed Jul. 10, 2002 for International Application No. PCT/US01/23646 filed Jul. 27, 2001.

* cited by examiner

Primary Examiner—Stephen Chin
Assistant Examiner—Sam K. Ahn
(74) Attorney, Agent, or Firm—Wallenstein Wagner & Rockey, Ltd.

(57) ABSTRACT

This invention relates to data communication equipment (DCE), more specifically, high speed transmission of electronic data between data terminal equipment (DTE). The invention sets forth a method and a device for transmitting a voltage signal waveform as a series of current pulses onto a communication line. The method requires converting an input voltage signal waveform to a current signal waveform and transmitting the resulting current pulses onto a communication line wherein a predetermined bias voltage is maintained.

5 Claims, 13 Drawing Sheets

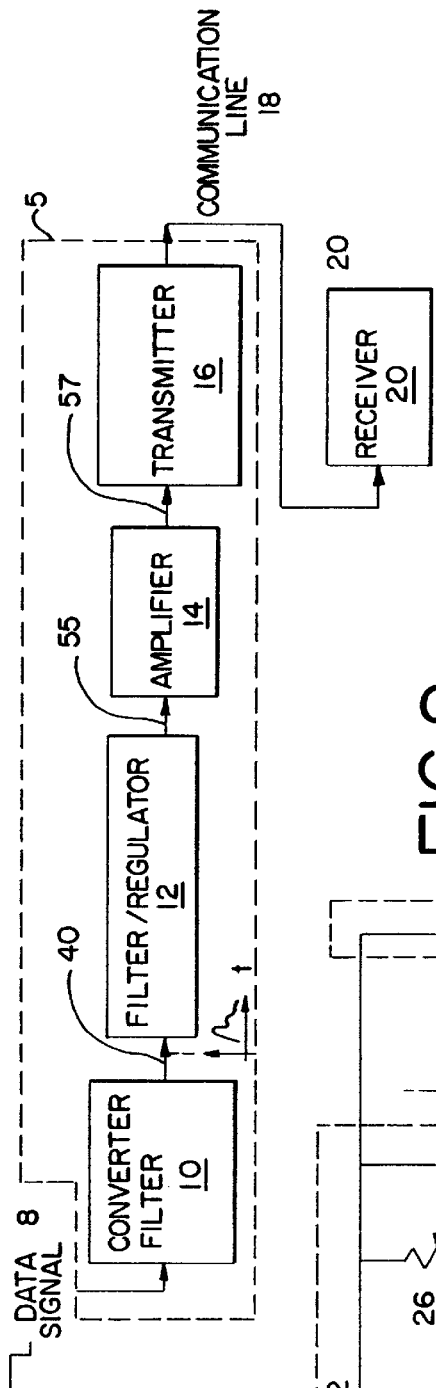
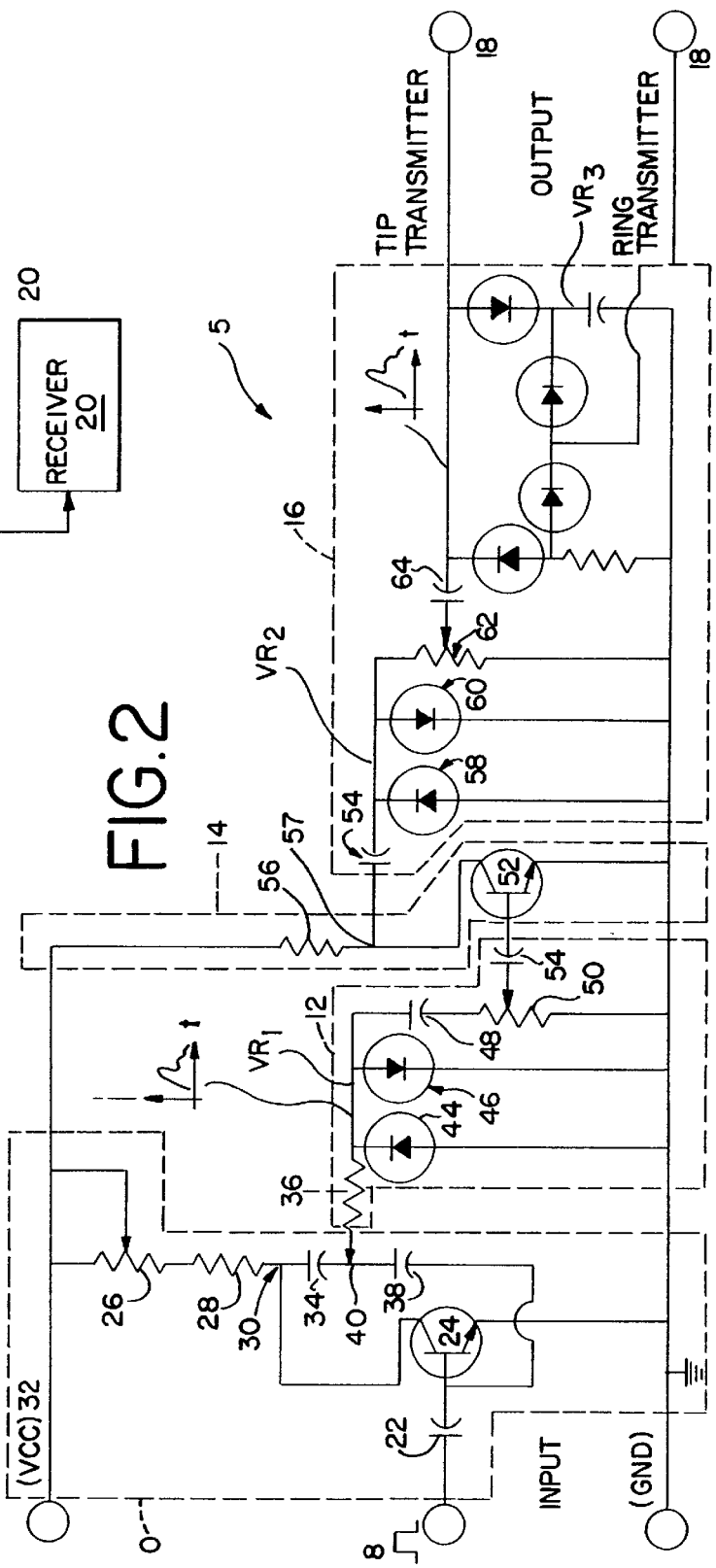

DATA TRANSMISSION APPARATUS AND METHOD

RELATED APPLICATIONS

This application claims the benefit of U.S. Provisional Application No. 60/111,170, filed Dec. 7, 1998.

TECHNICAL FIELD

The present invention generally relates to a method and device for transmitting data over a transmission medium at high speeds. More specifically, the present invention relates to using variations in electrical current for representing and conveying data over a transmission medium.

BACKGROUND OF THE INVENTION

There are many modems on the market today for high speed data bit transmission on a twisted-pair of copper telephone lines. Constant demand for increased amounts of data bit transmission has generated the continual need for faster modems capable of transmitting and receiving greater amounts of data. While many high speed transmission techniques such as ADSL and HDSL have emerged in response to this technological demand, there continues to remain a demand for yet greater data transmission rates. In addition, it would be extremely advantageous if the technology incorporating the higher transmission rates were able to implement existing electrical communication infrastructure, i.e., twisted-pair telephone lines. An additional preference would allow for the transmission of these signals at lower power over greater distances without needing fewer or any repeaters to amplify the signal.

Conventionally, data transmission is sent via voltage signals that are susceptible to many factors that may adversely affect the quality and distance of the transmission. Some of these factors include: random distortion noise, inherent characteristics or poor physical condition of the transmission line, transmission line length, high frequency, attenuation and distortion effects. One common approach used to overcome some of these adverse affects is to increase the transmission power. Of course, the greater the distance, the greater the impedance and the likelihood of effects due to exposure to external noise sources. FCC regulations also limit frequency levels and power levels of transmission. Bridge taps and loading coils, present in phone line infrastructure also present significant impediments to voltage signal data transmission. Bridge taps tend to divide voltage signals hence weakening them. Loading coils tend to resist changes in voltage level hence degrading data characterized by voltage level.

The amount of data that can be transmitted is directly related to the number of quantization levels that a transmitter utilizes. Random distortion noise directly affects the amount of quantization levels. Attempting to increase a transmission rate by merely increasing the amount of quantization levels beyond that in which the data bits can be determined is not useful. To date, the limitations on quantization caused by random distortion noise has prevented conventional modems and transmission techniques from meeting the demand for higher data transmission speed.

Additionally, today's transmission lines incorporate repeaters that amplify a signal that has attenuated or weakened during its transmission. The repeater is necessary to re-amplify the affected signal. A transmission signal that is expected to travel a great distance must often be re-amplified repeatedly.

Hence, prior to the present invention, a need existed for a method of data transmission capable of better recognizing and discriminating a signal from accompanying noise. Also needed, were methods and apparatus for transmitting data signals which would avoid or significantly reduce the adverse effects of the factors cited above, so as to provide data transmissions of higher quality, increased capacity, and longer transmission distances at lower power with fewer, or no need for repeaters.

SUMMARY OF THE INVENTION

This invention relates to data communication equipment (DCE), more specifically, a modem capable of high speed transmission of electronic data between data terminal equipment (DTE). Broadly stated, this invention sets forth a method and a device for transmitting data as a series of current pulses onto a transmission medium such as a communication line. The method requires converting an input signal waveform to a current signal waveform and transmitting the resulting current pulses onto a communication line wherein a predetermined bias voltage is maintained.

Transmitting data as current pulses is an improved method of transmitting data, as opposed to using voltage pulses, because current is not affected as much by capacitance. By virtue of Kirchoffs' Law, this allows the transmission of data over greater distances because the signal is less attenuated by line capacitance. With an increase in shunt capacitance and/or an increase in frequency across the capacitance, voltage data pulses weaken. Therefore, bridge taps associated with the current phone line infrastructure will not degrade the signals transmitted according to the invention to the same degree as they degrade (divide) conventional voltage signal waveforms. It is also known that loading coils exist in the infrastructure, are resistant to voltage changes, hence, the loading coils present a significant impediment to voltage waveform signals. On the other hand, it is believed that signals transmitted according to the present invention should be far less affected by loading coils.

Another embodiment of this invention includes a method of generating representative pulses of current from an input (either current or voltage) waveform and transmitting resulting current pulses onto a communication line. Another aspect of the invention includes receiving the current pulses, measuring the current pulses, and translating the measured current pulses into data.

A circuit for carrying out the method as it relates to transmitting standard voltage-based data, includes a converter for receiving voltage waveform input and generating a series of current pulses in response to the input voltage signal. A transmitter responsive to output of the converter is provided for transmitting the output onto a communication line terminated by a receiver.

Another embodiment of the invention provides an automatic system for adjusting series and shunt impedance of a transmitting system relative to changes in data and transmission medium by a circuit for measuring and correcting changes in series and shunt impedance of the line using references internal to the transmitter (voltage, current, impedance, and current range). A gain amplifier is used to control changes in impedance and signal current. Output voltage is kept at a reference level while output current is varied thereby controlling the impedance of the transmitter. The transmitter has a current source for supplying reference currents and a voltage source for supplying reference voltages and a gain controlling circuit for controlling a current signal within a range of values according to binary input data.

A common problem of other known modems is the deterioration of the transmission signal due to distortion effects over the transmission line. In effect, the transmission signal is not able to be identified because of the accompanying noise distortion. This invention is able to transmit significantly greater amounts of data than previous methods because it discriminates transmitted data from random distortion noise existing on the communication line.

A primary advantage of this invention is the provision of significantly increased amounts of data by being able to transmit and receive a low voltage signal amidst the accompanying random distortion noise and interference that was generally thought to be indeterminable.

A further advantage of this invention is the provision of significantly increased lengths of transmission than currently thought capable without the use of repeaters or amplifiers.

Another aspect of this invention is to transmit data at a low voltage and to further maintain this low voltage by monitoring and adjusting the current associated with the data signal.

It is further contemplated that the transmitter step of monitoring and adjusting the current includes the step of transmitting at least one reference/calibration pulse over the communication line and measuring the effects of line impedance on the current pulse.

These and other features of the present invention are discussed or apparent in the following detailed description.

BRIEF DESCRIPTION OF THE DRAWINGS

FIG. 1 is a schematic diagram, in block diagram form, of a preferred embodiment of a device incorporating an automatic impedance tuner in accordance with the present invention coupled to a receiver via a communication line;

FIG. 2 is a partial simplified schematic diagram of the embodiment depicted in FIG. 1 including a converter, filter/regulator, amplifier and transmitter;

DETAILED DESCRIPTION OF THE PREFERRED EMBODIMENT

Figure 3:
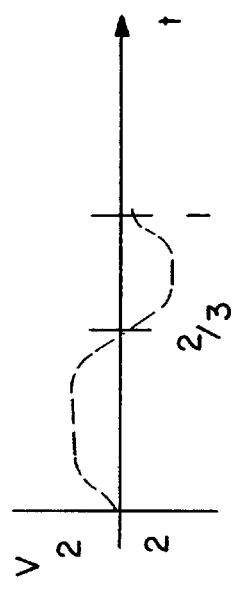
FIG. 3 is a graphical depiction of the modulated output of the converter of FIG. 2 after being partially modified by the filter/regulator.

While this invention is susceptible of embodiments in many different forms, there is shown in the drawings and will herein be described in detail, preferred embodiments of the invention with the understanding that the present disclosure is to be considered as an exemplification of the principles of the invention and it is not intended to limit the broad aspects of the invention to the embodiments illustrated.

Referring to FIG. 1, an automatic impedance tuner 5 is depicted having a converter/filter 10, filter/regulator 12, amplifier 14, and transmitter 16. The converter/filter 10 receives a digital voltage pulse signal 8 representing data. The input signal 8 is transformed by the converter 10 into a phase modulated current output 40 that is received by the filter/regulator 12.

The filter/regulator 12 measures current change, limits the voltage range of the phase modulated current output 40, and dampens ringing on the signal. In addition, the filter/regulator 12 differentiates the phase modulated current output 40, adjusts for current gain and narrows the current pulses of the phase modulated current output 40. Before being received by the amplifier 14, the differentiated signal output 55 generated by the filter/regulator 12 is widened and returned to a timing similar to input data signal 8.

The transmitter 16 adjusts the amplified current signal 57 generated by the amplifier 14 in response to filter/regulator 12. Accordingly, the transmitter 16 provides a desired voltage and current for transmission to a receiver 20 via communication line 18. Receiver 20 deciphers the transmission by detecting variations in the current received from the transmitter 16.

Referring to FIG. 2, a further defined schematic diagram of a preferred embodiment of an automatic impedance tuner 5 in accordance with the present invention is provided. The tuner 5 includes the converter/filter 10, filter/regulator 12, amplifier 14, and transmitter 16 of FIG. 1. Accordingly, the same reference numbers are used, where appropriate, within both FIGS. 1 and 2.

The converter/filter 10 includes a common emitter transistor 24, a filter capacitor 22, two coupling feedback capacitors 34, 38, and two current limiting resistors 26,28. The input voltage pulse signal 8 received by the converter/filter 10 is filtered by capacitor 22 connected to the base of the first common-emitter transistor 24. In part, the transistor operates as a cutoff circuit for keeping a sharp rise and fall time of the converter output 40, and thus the output of the tuner 5. Also, the first common-emitter transistor 24 provides a constant current reference through serially connected resistor 28 and adjustable resistor 26 wherein resistor 26 is coupled to a regulated power source 32 of about 8 volts and resistor 28 is attached to the collector 30 of the transistor. Preferably, the voltage potential at the collector 30 of the first common-emitter transistor 24 is approximately one-half the value of the voltage potential of the power source 32 with respect to ground, i.e., 4 volt. The collector 30 of the first common-emitter transistor 24 is fedback to its base through the two capacitors 34, 38 which are coupled together in series and operably connected at the junction of the capacitors to the output of the tuner 5. This internal feedback controls the automatic impedance tuner's 5 current output relative to the load on the communication line 18 and the power source 32. The coupling feedback capacitors 34 and 38 preferably are in a 2.2 to 1 ratio to modulate the input voltage signal 8 into a converted constant current signal received by the filter/regulator 12. As a result of the charging and discharging of the capacitors 34 and 38, the magnitude of each current pulse provided by the output 40 of the converter/filter 10 quickly rises to a peak, then falls to a plateau that is maintained for a time duration before the current magnitudes falling off rapidly.

Coupled to the converter's output 40 is the filter/regulator 12 comprising an AC and DC load that includes the load of the communication line 18. The filter/regulator 12 consists of a measuring resistor 36, a pair of clamping diodes, 44, 46, a filter capacitor 54 and a differentiator. At the input of the filter/regulator 12, the measuring resistor 36 is coupled between a pair of clamping diodes 44, 46, preferably geranium. In particular, the resistor 36 is connected to the cathode of diode 44 and the anode of diode 46. Moreover, the anode of diode 44 and the cathode of diode 46 are attached to ground. These diodes 44, 46 are used to reduce noise on the converted output signal 40 by dampening voltage ringing and oscillations. The diodes 44, 46 clamp the converted data signal to a voltage level between 0.2 and −0.2 volt, or 0.4 volt peak-to-peak as shown in FIG. 3. Moreover, a reference voltage range VR1 is maintained at the junction between the diodes 44 and 46.

In addition, the majority of the load provided by the filter/regulator 12 is AC. Part of the DC load of the filter/regulator 12 is fixed by the measuring resistor 36 and the pair of diodes 44, 46. This fixed DC load is used as a reference load.

The data signal 40 also is differentiated within the filter/regulator 12 wherein the pulses of the received signal are narrowed. The differentiator is preferably comprised of a capacitor 48 in series with an adjustable resistor 50 for adjusting the output AC current level of the automatic impedance tuner 5 relative to the power source 32. The pulses of the data signal are widened and returned to a timing similar to the original signal 8 by filter capacitor 54. Moreover, resistor 50 provides for adjusting current gain.

The differentiated current signal 55 from the filter capacitor 54 of the filter/regulator 12 is received by the amplifier 14 which includes a second common-emitter transistor 52 for amplifying the differentiated current signal and a voltage limiting pull-up resistor 56 for limiting the voltage at the collector of the second common-emitter transistor 52. Preferably, the collector has a voltage of about 6 volt (i.e., close to the threshold turnoff) and is coupled to the transmitter 16. Via capacitor 64, the switching of shunt transistor 52 is effected by changes in the voltage at the tip transmitter 18 for maintaining a substantially constant voltage level at the tip transmitter.

The transmitter 16 includes a coupling capacitor 54, a pair of clamping diodes 58, 60 and a resistor-capacitor 62, 64 combination. The coupling capacitor 54 at the input of the transmitter 16 is attached to the output of the amplifier 14. The coupling capacitor 54 widens the pulses of the amplified current signal 57. Coupled between the filter capacitor 54 and the adjustable resistor 62 are two clamping diodes, 58, 60, preferably of type silicon, for maintaining the amplified current signal 57 within a voltage range VR2 between 0.7 and −0.7 volt, 1.4 volt peak-to-peak. The adjustable resistor 62 controls the voltage level and the AC current through a capacitor 64 while the two clamping diodes 58, 60 control the DC offset relative to ground. The adjustable resistor 62 and capacitor 64 adjust the voltage level on the communication line to approximately 1 volt, peak-to-peak. Prior to reaching the communication line, a diode-capacitor combination filters the AC portion of the signal from negative going noise spikes and a diode-resistor combination filters the DC portion of the signal from positive going noise spikes.

Figure 4:
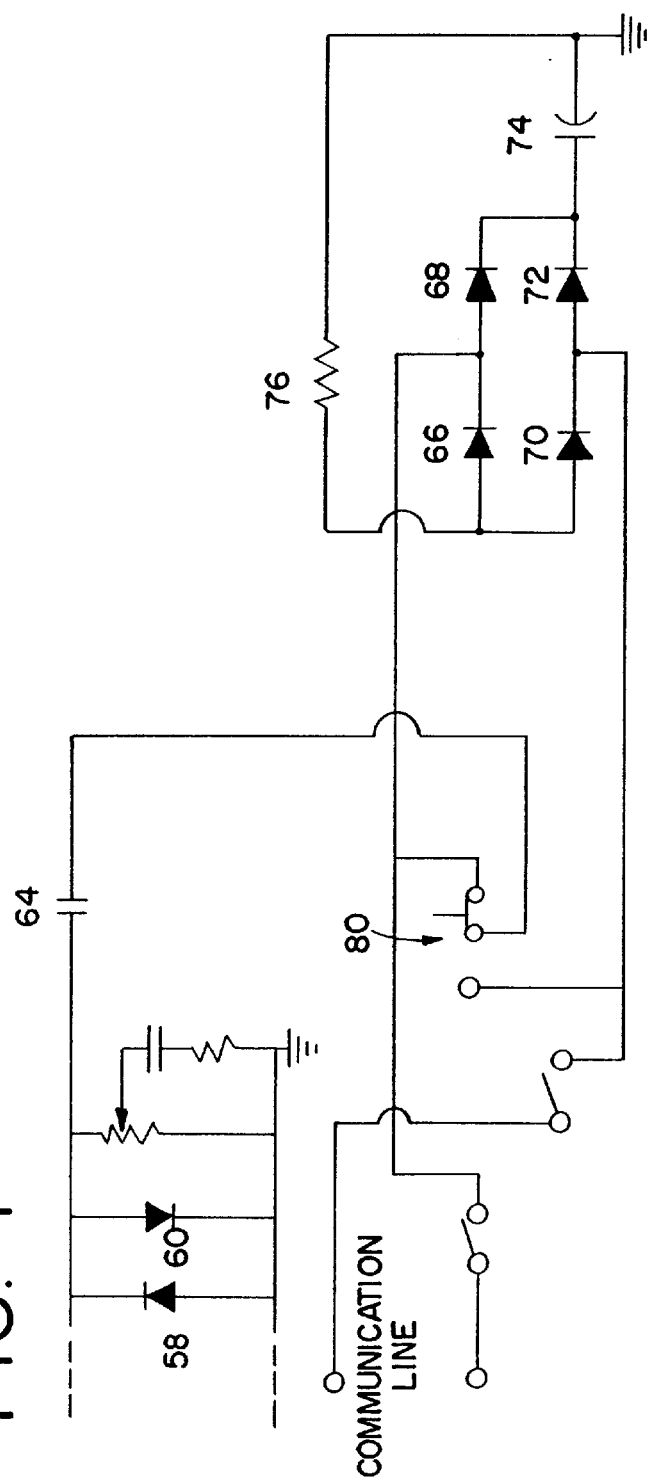
FIG. 4 is a partial schematic of an alternative embodiment of the transmitter of FIG. 2.

In an alternative embodiment, depicted in FIG. 4, the collector of the second common-emitter transistor 52 within the transmitter 14 is attached to two capacitors 54, 64 in series and then to a line-side select switch 80. Signal transmission can be placed on either the Tip 4 or the Ring 5 lines of the twisted copper pair of wiring, however, use of the Tip 4 line is preferred. Use of a line-side select switch 80 is connected to the junction of two diodes, 70, 72. If the Tip 4 line is going to be used as the output, a diode 72 and a capacitor 74 filter the AC portion of the signal from negative going noise spikes. A diode 70 and a resistor 76 are used to filter the DC portion of the positive going noise spikes. If the Ring 5 line is going to be used as the output, then a diode 68 and capacitor 74 are used to filter the AC portion of the signal from negative going noise spikes while another diode 66 and a resistor 76 filter the DC portion of the positive going noise spikes.

Figure 5:
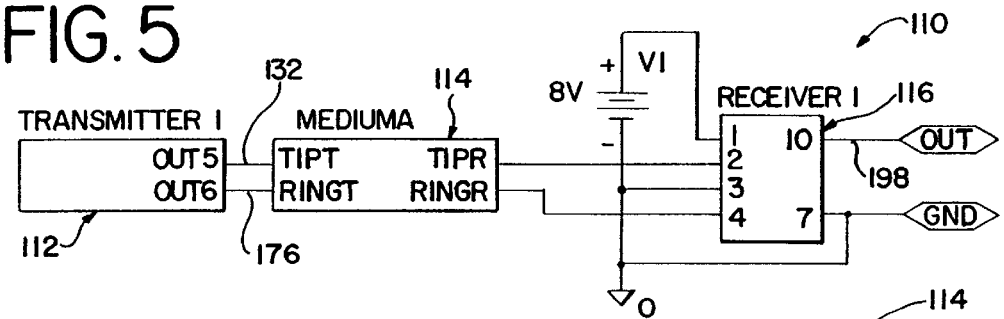
FIG. 5 is a simplified block diagram of a system in accordance with the present invention including a data transmitter device, a transmission medium and a receiver.

Turning to FIG. 5, a simplified block diagram is depicted of a system in accordance with the present invention. The system 110 includes a data transmitter device 112, a data transmission medium 114, and a data receiver 116. The data receiver 116 receives data signals transmitted from the transmitter 112 across the transmission medium 114.

Figure 6:
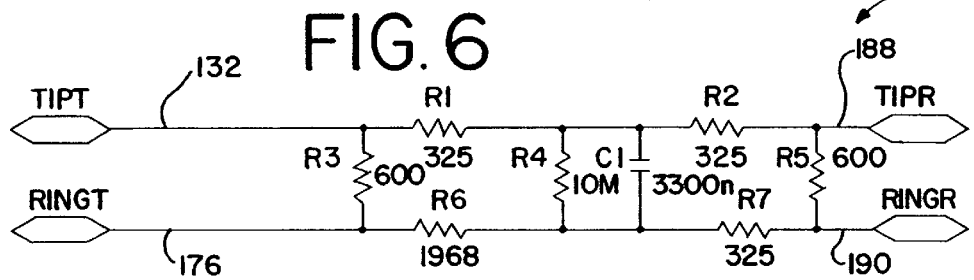
FIG. 6 is a schematic diagram of an embodiment of the transmission medium shown in FIG. 5.
Figure 7:
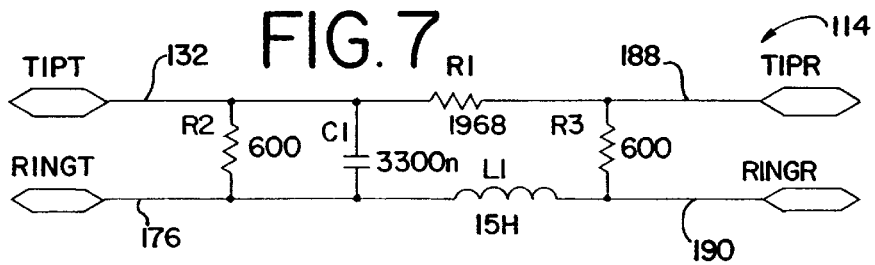
FIG. 7 is a schematic diagram of an alternative embodiment of the transmission medium shown in FIG. 5.

In FIG. 6, the transmission medium 114 is modeled to provide conventional characteristics found in telephone transmission cables or the like that do not include a significant amount of inductance. The transmission medium receives input signal pair 132 and 172 and provides corresponding output signal pair 188 and 190. In an alternative embodiment shown in FIG. 7, the transmission medium 114 can be modeled to provide characteristics found in transmission mediums having, for example, about 15 mH of inductance as found in many conventional preexisting transmission mediums.

Figure 8:
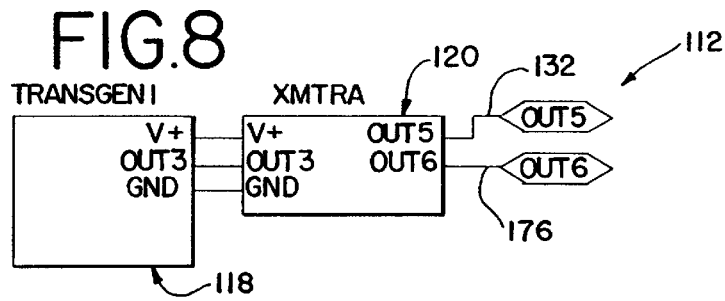
FIG. 8 is an expanded block diagram of the data transmitter device of FIG. 5 including a data generator connected to a transmitter.
Figure 9:
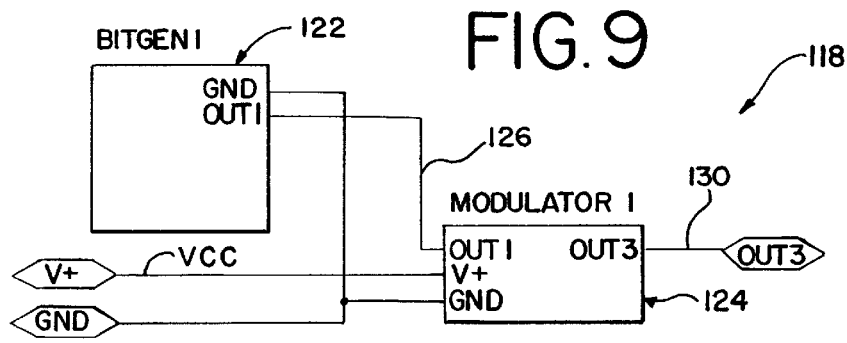
FIG. 9 is an expanded block diagram of the data generator shown in FIG. 8 comprising a bit generator and a modulator.
Figure 10:
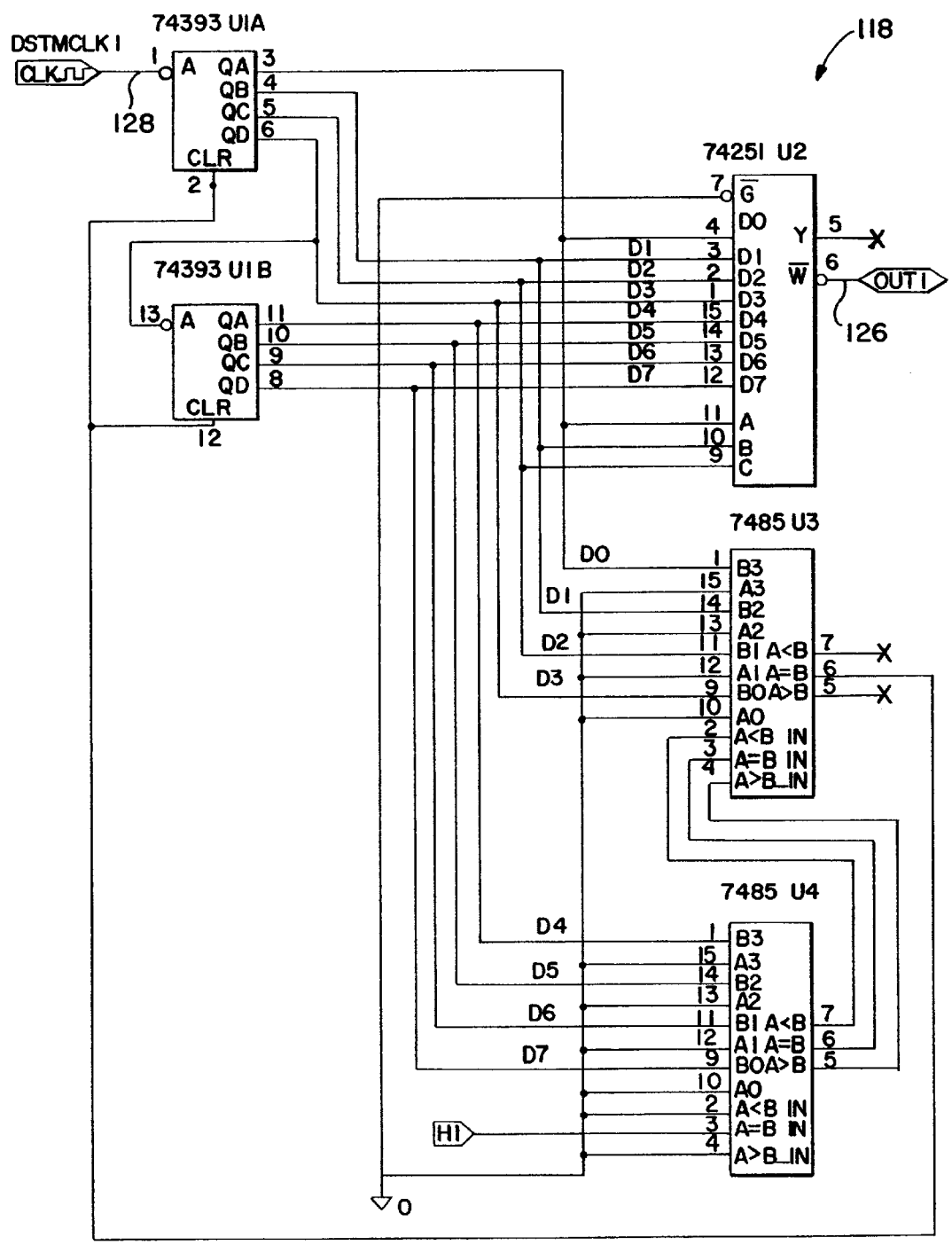
FIG. 10 is a schematic diagram of an embodiment of a bit generator shown in FIG. 9.
Figure 11:
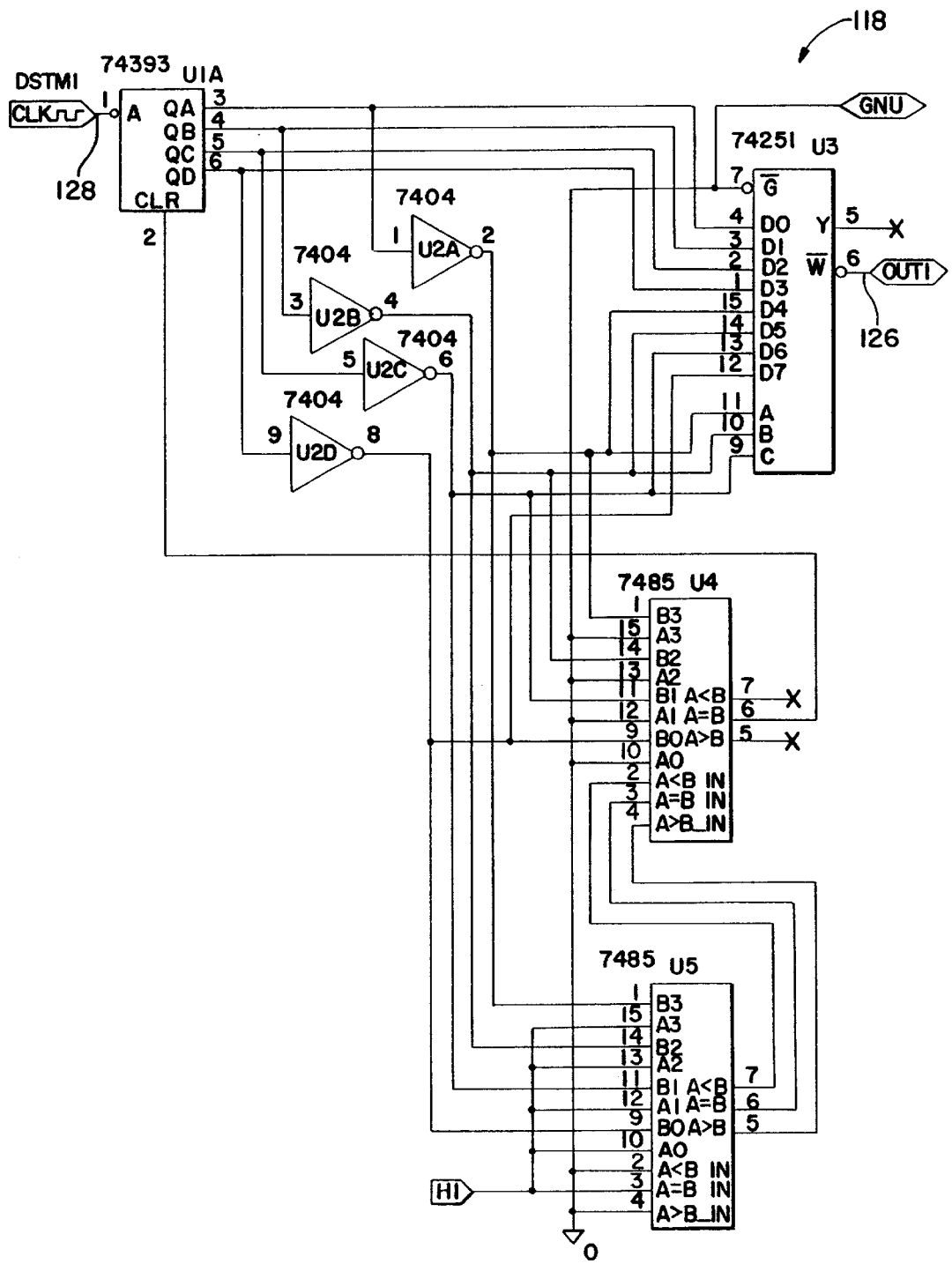
FIG. 11 is a schematic diagram of an alternative embodiment of a bit generator shown in FIG. 9.

As shown in FIG. 8, the data transmitter 112 preferably includes a data generator 118 and a transmitter 120 operably coupled together. In a preferred embodiment shown in FIG. 9 for testing the circuitry, the data generator 118 includes a bit generator 122 and a modulator 124. The bit generator 122 provides a data signal 126 represented as a series of voltage pules preferably in the range of about 0 to 5 volt. As shown in FIG. 10, the bit generator 122 can consist of a counting circuit responsive to a digital reference clock signal 128 wherein a series of digital data signals 126 are provided corresponding to binary numeric values and increasing in binary numeric magnitude at a constant incremental rate. Alternatively, in another embodiment for testing shown in FIG. 11, the bit generator 122 can consist of a counting circuit responsive to a digital reference clock signal 128 for providing digital data signals 126 corresponding to numeric values and decreasing in binary numerical magnitude at a constant incremental rate.

Figure 12:
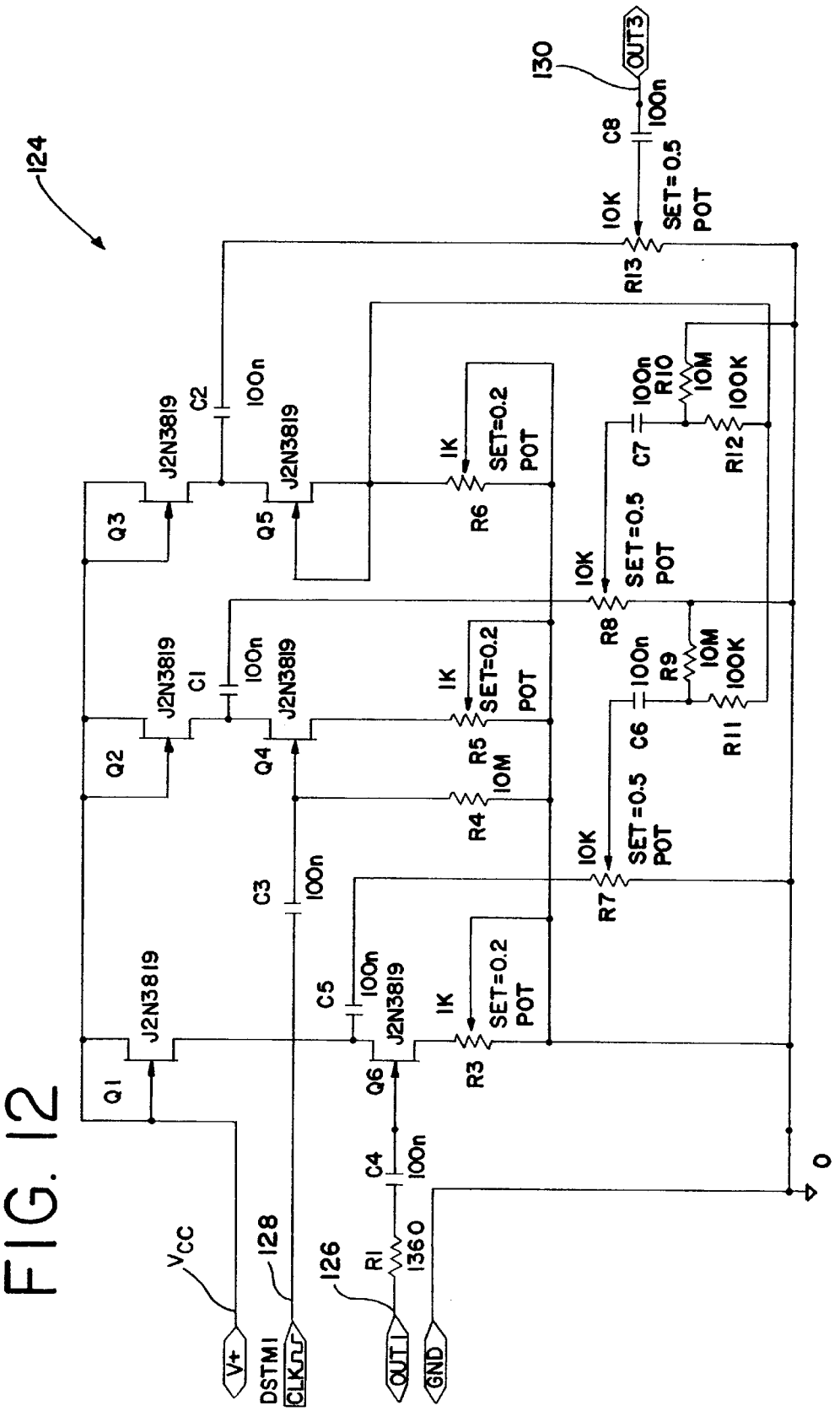
FIG. 12 is a schematic diagram of the modulator shown in FIG. 9.

As shown in FIG. 12, the digital data signals 126 from the bit generator 122 along with digital reference clock signal 128 are received by the modulator 124. In response to these signals, the modulator 124 generates a modulated digital data signal 130 comprising the digital data signals 126 added to the clock signal 128.

Figure 13:
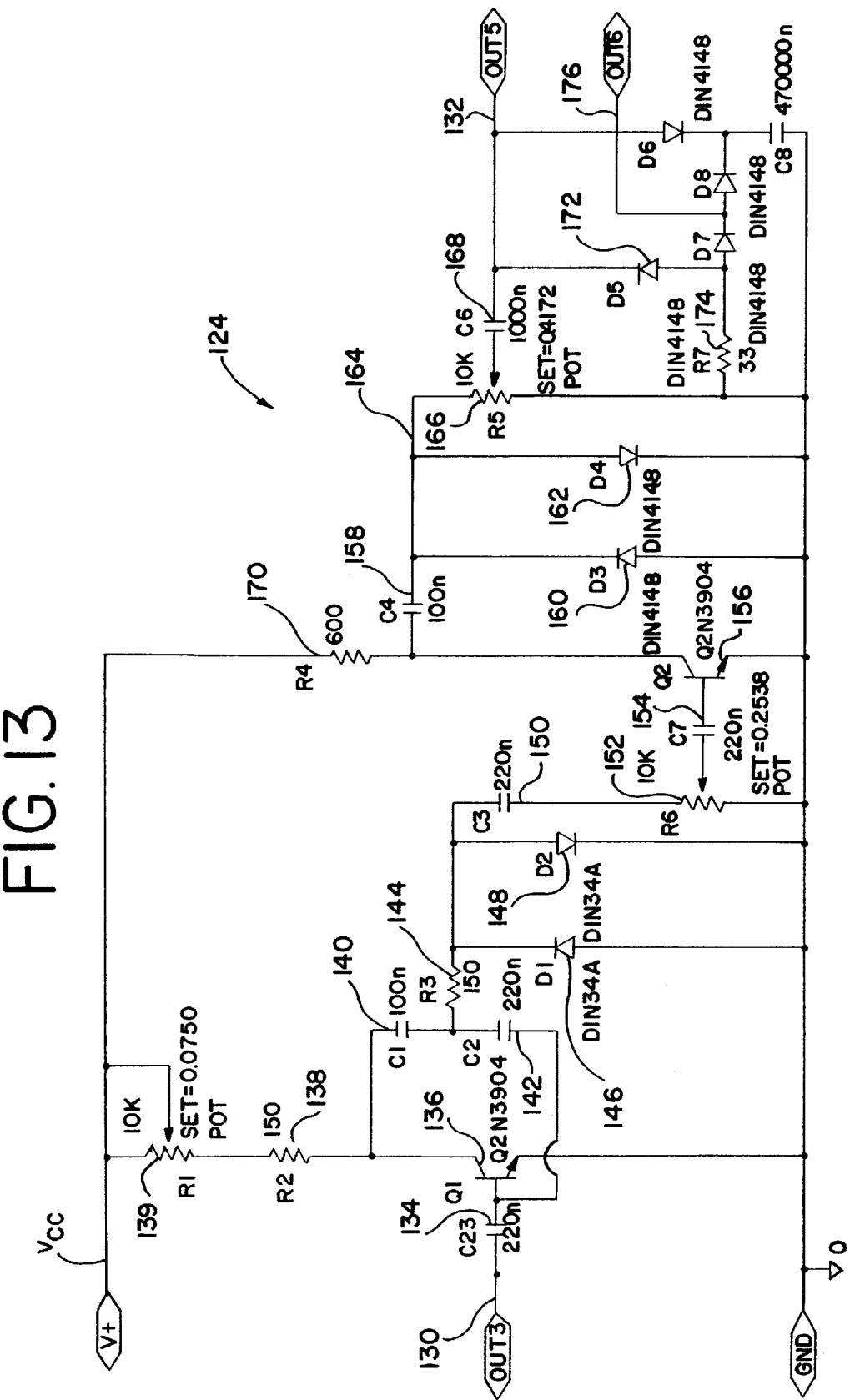
FIG. 13 is a schematic diagram of the transmitter shown in FIG. 8.

The modulated digital signals 130 are received by the transmitter 124 for conversion and transmission across the transmission medium 114 to the receiver 116. As shown in FIG. 13, the transmitter 124 is similar to that shown in FIG. 2 and described above. In particular, the transmitter 124 receives the digital signals 130 and converts them into current pulses while maintaining a substantially constant voltage level on the output 132. Preferably, the voltage level is about 1 volt.

In particular, the digital signals 130 are fed to the capacitor 134 attached to the base of transistor 136. This transistor 136 is a constant current reference through resistor 138 and adjustable resistor 139 to Vcc, preferably about +8V. The transistor 136 has feedback from it's collector to it's base through two capacitors 140 and 142 in series. This controls the transmitter current relative to the load and Vcc. At the junctions of capacitors 140 and 142 is an AC and DC load including the line, which the majority of the load being AC. Part of the DC load at this junction is fixed by a resistor 144 and diodes 146 and 148. The fixed DC load is used as a reference load. The diodes 146 and 148 clamp the peaks to 0.7 V positive and negative going resulting in a 1.4V peak to peak output. The junction of 144, 146 and 148 goes to a capacitor 150 and then to an adjustable resistor 152. This adjustable resistor 152 adjusts the output AC current level of the transmitter 124 relative to Vcc then goes to a capacitor 154 and then to the base of a transistor 156. The transistor's collector goes to capacitor 158 coupled to diodes 160 and 162 for clamping the peaks to 0.7v positive and negative going resulting in a 1.4V peak to peak output 164. Also attached to the output 164 is an adjustable resistor 166 for controlling the voltage level and the AC current through a capacitor 168. The collector of transistor 154 also is coupled to a resistor 170 attached to Vcc for limiting the voltage that the transistor will reach when fully turned on. Furthermore, serial connected diode 172 and resistor 174 are coupled between ground and output 132 for filtering the DC portion of positive going noise spikes.

Figure 14:
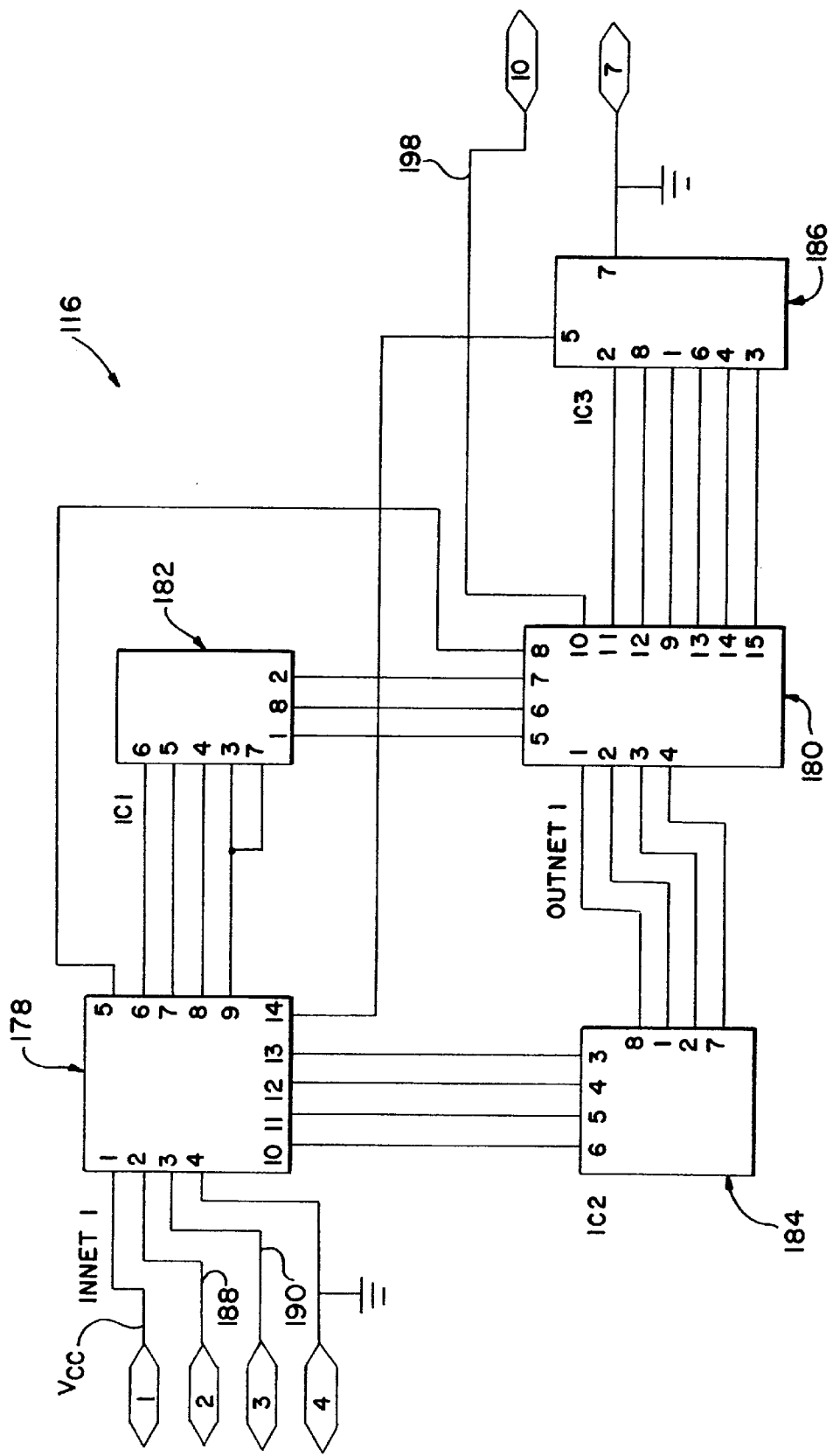
FIG. 14 is a schematic diagram of a receiver shown in FIG. 5, the receiver comprising an input network, output network, amplifier IC1, amplifier IC2, and amplifier IC3.
Figure 15:
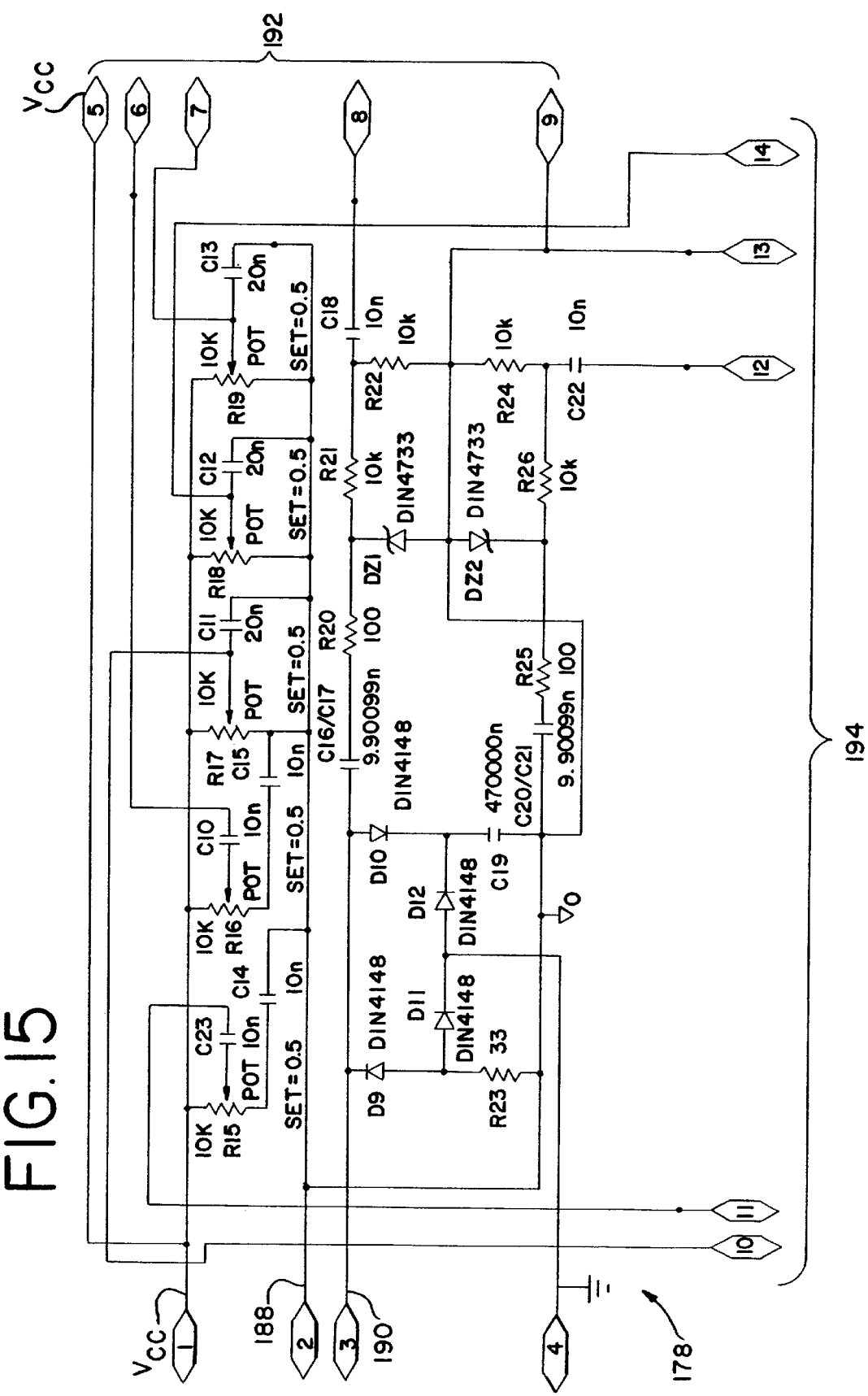
FIG. 15 is an expanded schematic diagram of the input network shown in FIG. 14.
Figure 16:
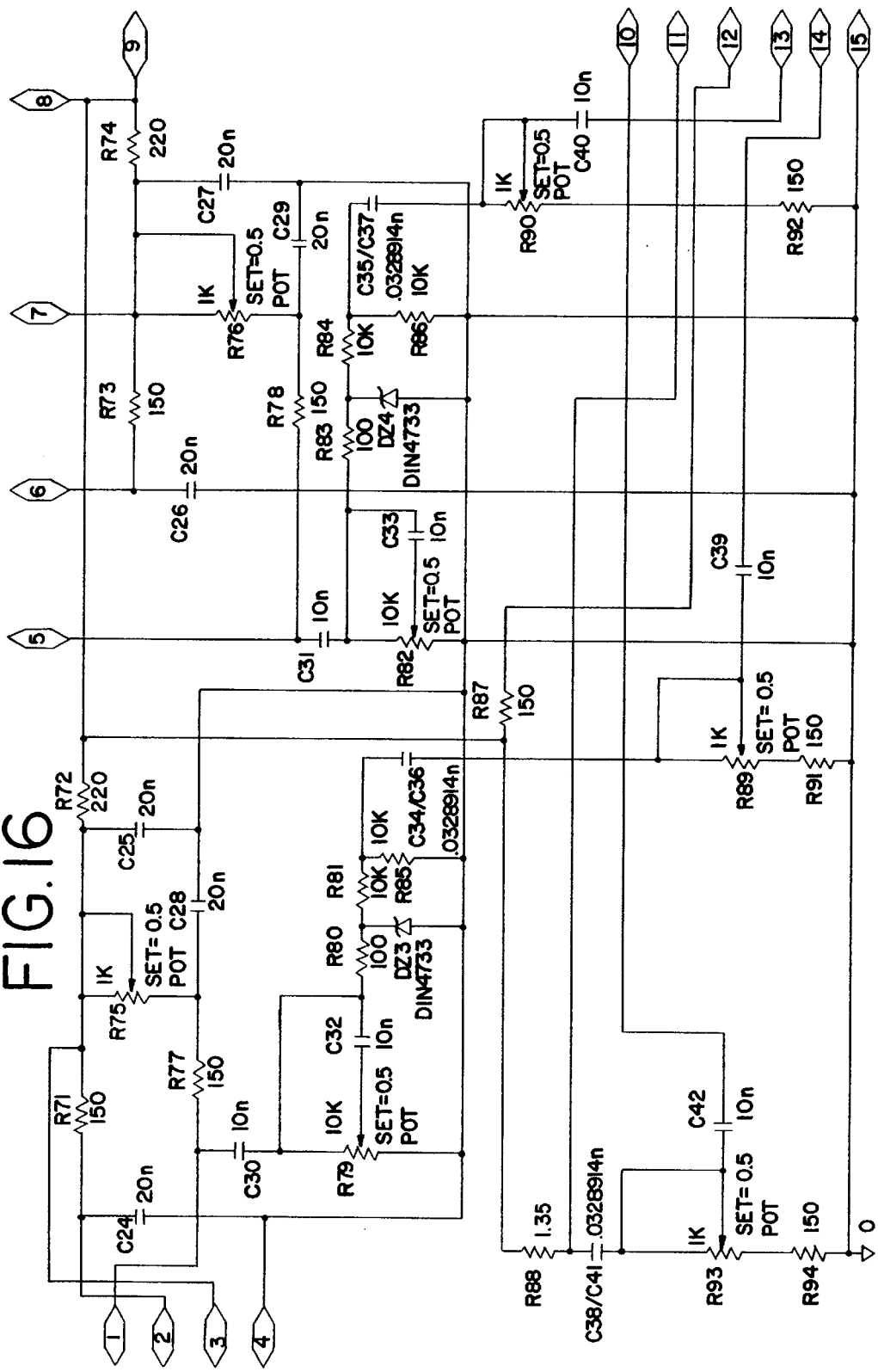
FIG. 16 is an expanded schematic diagram of the output network shown in FIG. 14.
Figure 17:
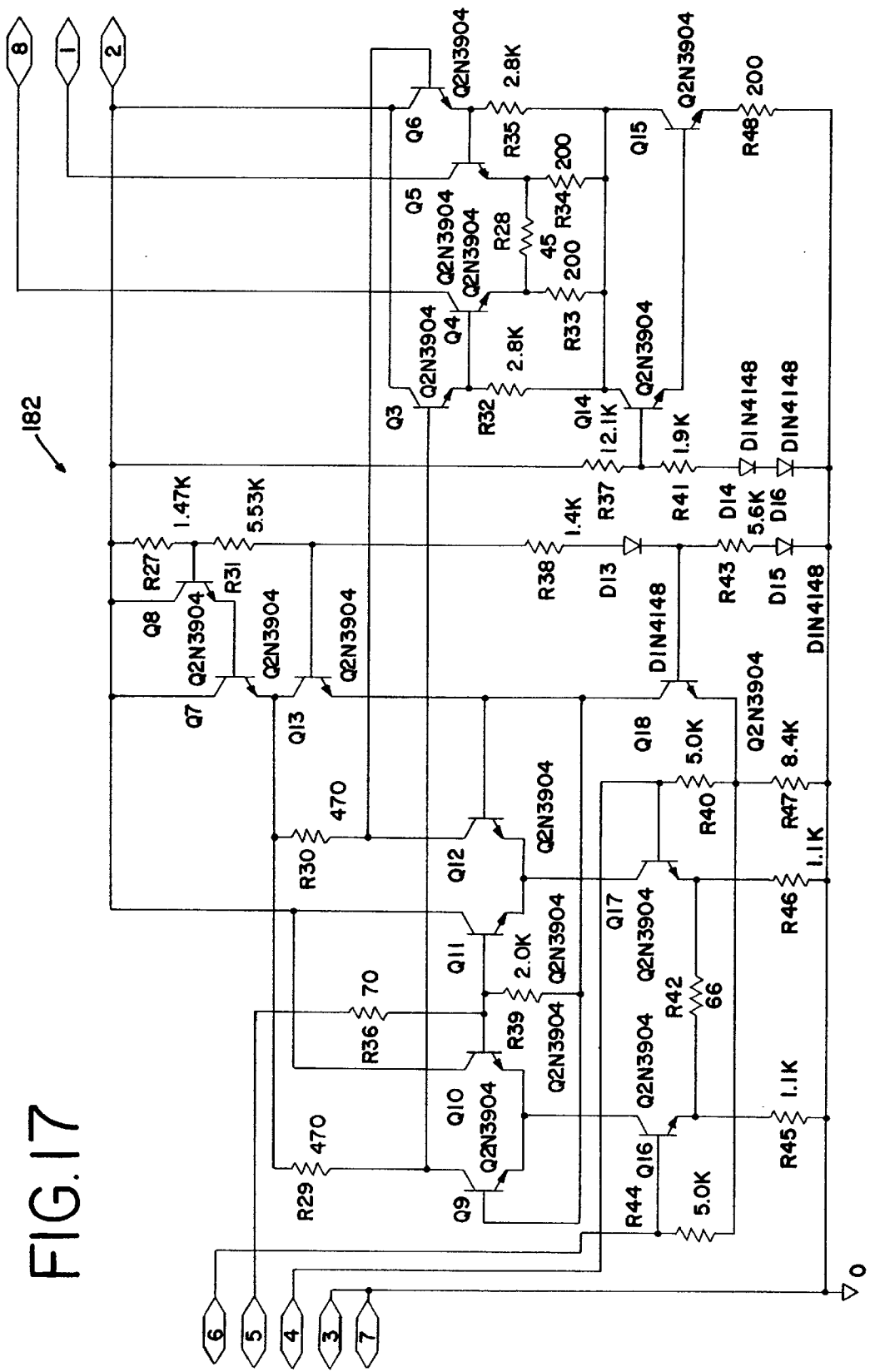
FIG. 17 is an expanded schematic diagram of amplifier IC1 shown in FIG. 14.
Figure 18:
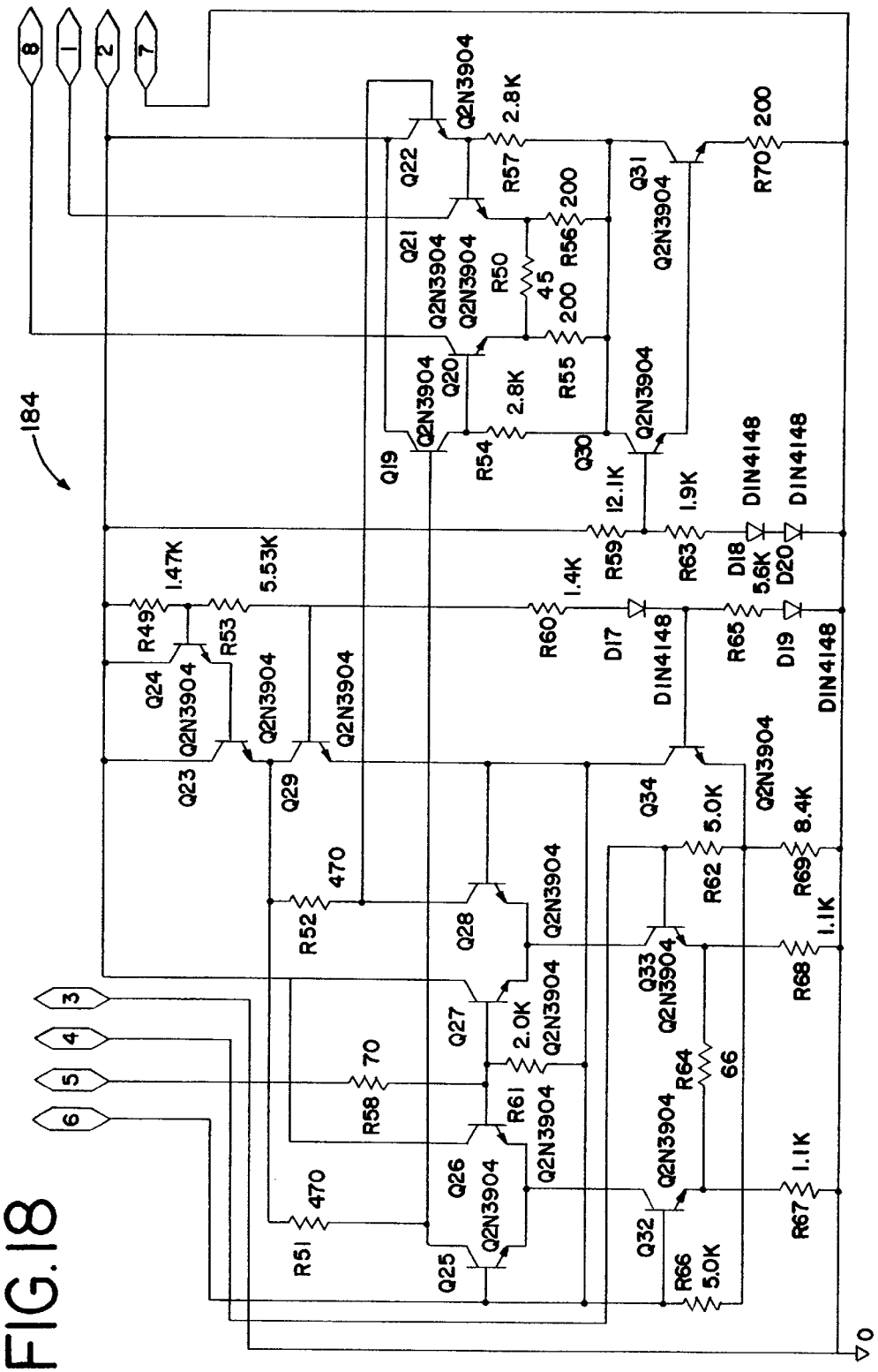
FIG. 18 is an expanded schematic diagram of amplifier IC2 shown in FIG. 14.
Figure 19:
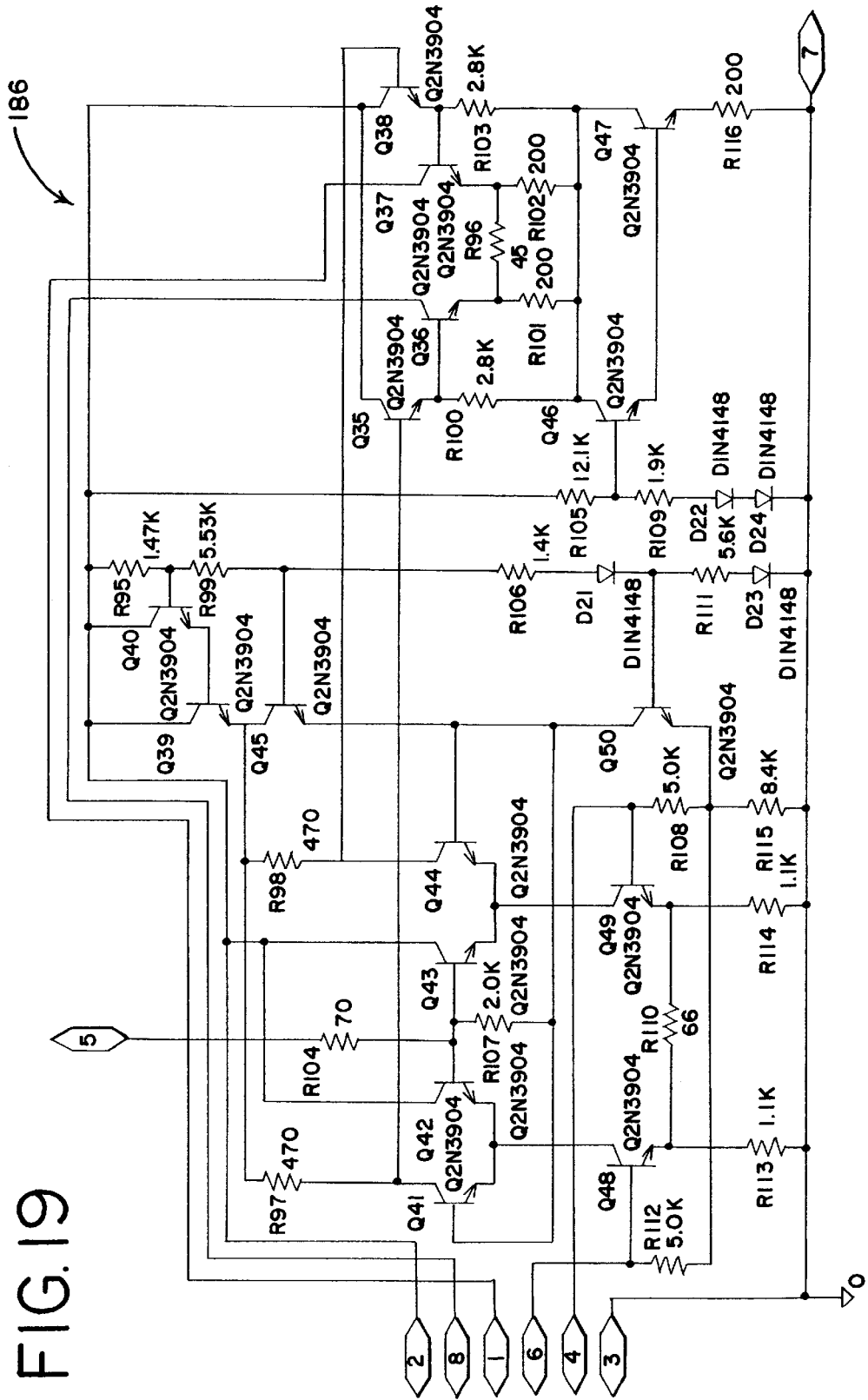
FIG. 19 is an expanded schematic diagram of amplifier IC3 shown if FIG. 14.

As shown in FIG. 14, the receiver 116 includes an input network 178, an output network 180, and a plurality of integrated IF amplifiers 182, 184, and 186. Referring to FIGS. 5 and 16, TIP and the RING signals 132 and 136 are transmitted across the transmission medium 144 and the input network 178 receives corresponding TIP and RING signals 188 and 190, respectively. In response to signals 188 and 190, the input network 178 filters out noise to provide filtered data output signal groups 192 and 194.

The filtered signal groups 192 and 194 are received by IF amplifiers 182 and 184, respectively, for amplifying the signals and passing them to the output network 180 where the signals are mixed together and amplified by amplifier 186 to produce a noise reduced digital data output signal 196 corresponding to the digital data input 126 from the data generator 122.

Twisted-pair phone lines are disclosed as a preferred embodiment only due to their prevalence in the global telecommunication infrastructure. It is contemplated that advantages may be had employing the basic concepts of the invention in transmission of data over shielded coaxial cable lines, category 5 lines, twisted-pair copper lines, etc. It is even contemplated that the present invention may be advantageously employed with wireless communication mediums such as broadcast in air, since signal attenuation, concerns also apply to this transmission medium.

"Transmission medium," as used herein relates to a communication line or an electromagnetic signal path from a first device to a second device being physically and spatially remote from the first. "Communication line" as used herein relates only to one or more conductors and the like used for transmitting data from a first device to a second device being physically and spatially remote from the first. "Remote," means, that neither the first nor the second device share the same chassis, housing, or support structure. In its most concrete and conventional form, remote would contemplate one modem communicating with another over conventional telecommunication lines, although it is not intended to be so limited. In short, the present invention addresses data transmission problems presently faced by telecommunications industry, Internet, and local area networks in communication between remote devices.

Presently it is believed that one of the most needed areas for the invention is for data transmission along a "communication line" from homes and businesses to and from a telecommunications central switching office ("CO" or "switching office"). This is where a bulk of the twisted-pair copper communication line infrastructure is deployed.

It should also be understood that only preferred embodiments of the present methods and circuits are described herein. It is intended that changes and modifications may be made in the embodiments disclosed without departing from the true scope and spirit of the present invention as defined by the appended claims.

For example, it should be understood that the embodiments only illustrate converting input voltage signals because most devices today provide data in this form, e.g. computers. However, the invention contemplates transmission of current pulse which do not have to be converted to the extent a data device may, in the future, provide output data as current pulses to begin with. In such case, the present invention may be employed without conversion related to voltage/current but only for data encoding schemes and the like as may be desired for transmission purposes.

What is claimed is:

1. A circuit for transmitting an input voltage signal waveform as a series of current pulses onto a communication line comprising:

a converter for receiving said input voltage signal waveform and generating an output in response thereto;

a transmitter responsive to said output of said converter for transmitting said series of current pulses on said communication line;

wherein said converter includes, a first common emitter transistor;

first, second and third capacitors, each having two ends;

a first end of said first capacitor receptive to said input voltage signal waveform;

a second end of said first capacitor and first end of said second capacitor coupled to a base of said first common emitter transistor;

a resistor coupled between a collector of said first common emitter transistor and a voltage input;

a first end of said third capacitor coupled to said collector of said common emitter transistor and said second end of said third capacitor coupled to said second end of said second capacitor; and, a resistor coupled to said second ends of said second and third capacitors.

2. The circuit of claim 1 wherein said transmitter includes, a first capacitor having a first end and a second end, said first end operably connected to said amplifier;

a pair of oppositely biased diodes having two ends;

first ends of said pair of oppositely biased diodes coupled between second end of said first capacitor and ground;

a variable resistor having two ends;

a first end of said variable resistor coupled to second end of said first capacitor and said first ends of said pair of oppositely biased diodes; and, a second capacitor having two sides, first side of said second capacitor coupled to second end of said variable resistor, wherein said second end of said second capacitor is connected to the communication line.

3. A circuit for transmitting an input voltage signal waveform as a series of current pulses onto a communication line comprising:

a converter for receiving said input voltage signal waveform and generating an output in response thereto;

a transmitter responsive to said output of said converter for transmitting said series of current pulses on said communication line;

a filter operably connected between said converter and said transmitter;

wherein said filter includes, a pair of oppositely biased diodes having two ends;

first ends of said pair of oppositely biased diodes operably connected to said converter;

a differentiator operably connected to second ends of said pair of oppositely biased diodes; and a capacitor coupled between said differentiator and an amplifier.

4. The circuit of claim 3 wherein said differentiator comprises a capacitor in series with a variable resistor.

5. A circuit for transmitting an input voltage signal waveform as a series of current pulses onto a communication line comprising:

a converter for receiving said input voltage signal waveform and generating an output in response thereto;

a transmitter responsive to said output of said converter for transmitting said series of current pulses on said communication line an amplifier operably connected between said converter and said transmitter, wherein said amplifier includes, a common emitter transistor having a collector coupled to said transmitter;

a resistor connected to a voltage input, said resistor also connected to said collector of said common emitter transistor and said transmitter; and a base of said common emitter transistor receptive to said output of said converter.

* * * * *

UNITED STATES PATENT AND TRADEMARK OFFICE
CERTIFICATE OF CORRECTION

PATENT NO. : 6,760,380 B1
DATED : July 6, 2004
INVENTOR(S) : Anderson

It is certified that error appears in the above-identified patent and that said Letters Patent is hereby corrected as shown below:

<u>Column 9,</u>
Line 1, after the word "a" and before the word "resistor" insert -- measuring --.

Signed and Sealed this

Twenty-fifth Day of October, 2005

JON W. DUDAS
*Director of the United States Patent and Trademark Office*